US012782776B2

(12) United States Patent
Su et al.

(10) Patent No.: US 12,782,776 B2
(45) Date of Patent: Nov. 3, 2026

(54) DISPLAY DEVICE

(71) Applicant: CARUX TECHNOLOGY PTE. LTD., Singapore (SG)

(72) Inventors: Ching-Tsung Su, Tainan (TW); Che-Chang Hu, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/902,948

(22) Filed: Oct. 1, 2024

(65) Prior Publication Data

US 2025/0147362 A1 May 8, 2025

(30) Foreign Application Priority Data

Nov. 7, 2023 (CN) ........................ 202311472721.8

(51) Int. Cl.

*G02F 1/13363* (2006.01)
*G02F 1/1333* (2006.01)
*G02F 1/1335* (2006.01)

(52) U.S. Cl.

CPC .. *G02F 1/133638* (2021.01); *G02F 1/133331* (2021.01); *G02F 1/133528* (2013.01); *G02F 2202/28* (2013.01); *G02F 2413/01* (2013.01); *G02F 2413/05* (2013.01)

(58) Field of Classification Search

CPC ......... G02F 1/133638; G02F 1/133331; G02F 1/133528

See application file for complete search history.

(56) References Cited

U.S. PATENT DOCUMENTS 11,611,058 B2 * 3/2023 Chen .................... G02B 5/3083
12,007,642 B2 * 6/2024 Ishikawa ........... G02F 1/133528
2008/0174735 A1 7/2008 Quach et al.
2012/0105400 A1 5/2012 Mathew et al.
2014/0132861 A1 * 5/2014 Wang .................... G06F 3/0443 349/12
2016/0098913 A1 * 4/2016 Vastmans ............... G08B 13/08 356/73.1
2017/0029677 A1 * 2/2017 Kitano ..................... C09J 11/06
2017/0289324 A1 10/2017 Yeo et al.
2018/0314871 A1 * 11/2018 He ........................ B06B 1/0622
2018/0357462 A1 * 12/2018 Mackey ................ G01J 1/0429
2019/0079236 A1 3/2019 Hung (Continued)

FOREIGN PATENT DOCUMENTS

CN 109545099 3/2019
CN 110730968 A * 1/2020 ......... G06V 40/1318

(Continued)

OTHER PUBLICATIONS

Translation of CN 112602011 A (Year: 2021).*
"Search Report of Europe Counterpart Application", issued on Mar. 21, 2025, p. 1-p. 9.

*Primary Examiner* — Lucy P Chien
(74) *Attorney, Agent, or Firm* — JCIPRNET

(57) ABSTRACT

A display device includes a cover plate, a display panel, a sensor and an optical structure. The display panel is disposed under the cover plate. The sensor is disposed under the cover plate. The optical structure is disposed under the cover plate and includes a polarizer and a quarter-wave plate, wherein the quarter-wave plate is disposed between the polarizer and the sensor.

20 Claims, 8 Drawing Sheets

(56) References Cited

U.S. PATENT DOCUMENTS

| | | | | |
|---|---|---|---|---|
| 2020/0364436 | A1 | 11/2020 | Beon et al. | |
| 2021/0036265 | A1* | 2/2021 | Fleischman | H10K 59/12 |
| 2021/0199984 | A1* | 7/2021 | Park | G02B 30/30 |
| 2022/0165189 | A1* | 5/2022 | Lee | G02B 7/02 |
| 2022/0401954 | A1* | 12/2022 | Angeles | B01L 3/502715 |

FOREIGN PATENT DOCUMENTS

| | | | | | |
|---|---|---|---|---|---|
| CN | 115955872 | A | * | 4/2023 | H10K 59/8793 |
| JP | 2021162862 | A | * | 10/2021 | G09F 9/301 |
| KR | 102073000 | B1 | * | 2/2020 | G06F 3/041 |

* cited by examiner

DISPLAY DEVICE

CROSS-REFERENCE TO RELATED APPLICATION

This application claims the priority benefit of China application serial no. 202311472721.8, filed on Nov. 7, 2023. The entirety of the above-mentioned patent application is hereby incorporated by reference herein and made a part of this specification.

BACKGROUND

Technical Field

The disclosure relates to an electronic device, and in particular relates to a display device.

Description of Related Art

Exposed sensors in electronic devices may easily induce a negative perception of surveillance among users. However, if a light-shielding layer is used to hide the sensor, the light-shielding layer may absorb visible light, which may adversely affect the image quality.

SUMMARY

A display device that helps reduce the visibility of a sensor is provided in the disclosure.

According to embodiments of the disclosure, a display device includes a cover plate, a display panel, a sensor, and an optical structure. The display panel is disposed under the cover plate. The sensor is disposed under the cover plate. The optical structure is disposed under the cover plate and includes a polarizer and a quarter-wave plate, wherein the quarter-wave plate is disposed between the polarizer and the sensor.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
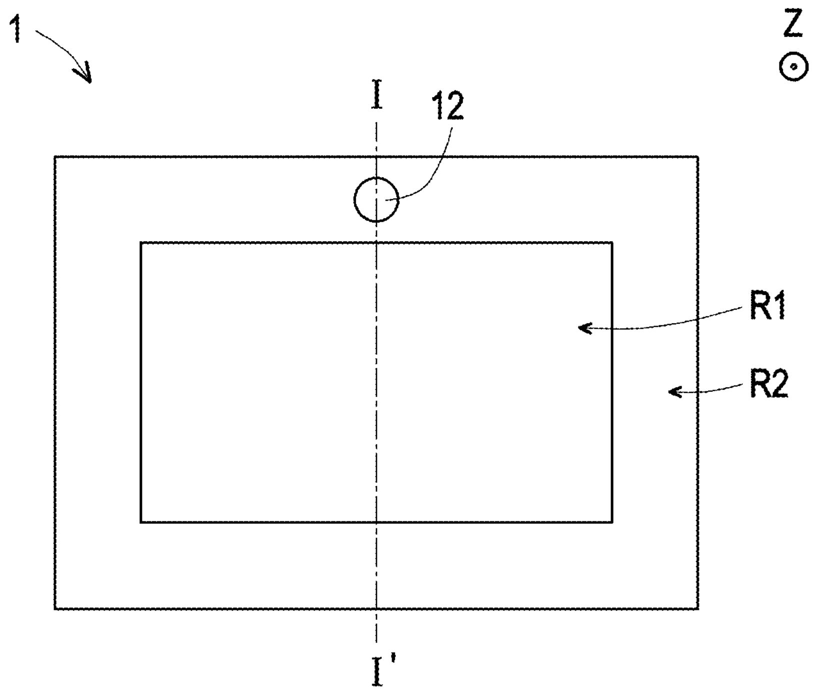
FIG. 1 is a top view schematic diagram of a display device according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Certain terms may be used throughout the disclosure and the appended claims to refer to specific elements. It should be understood by those skilled in the art that electronic device manufacturers may refer to the same elements by different names. The disclosure does not intend to distinguish between elements that have the same function but have different names. In the following description and claims, words such as “comprising” and “including” are open-ended words, so they should be interpreted as meaning “including but not limited to . . . ”.

In the disclosure, wordings used to indicate directions, such as “up,” “down,” “front,” “back,” “left,” and “right,” merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

A structure (or layer, element, substrate) described in this disclosure is located on/above another structure (or layer, element, substrate), may indicate that the two structures are adjacent and directly connected, or may indicate that the two structures are adjacent but not directly connected. Indirect connection means that there is at least one intermediate structure (or intermediate layer, intermediate element, intermediate substrate, intermediate spacer) between the two structures, the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or a non-physical structure, which is not limited thereto. In the disclosure, when a certain structure is disposed “on” other structures, it may mean that a certain structure is “directly” on other structures, or it means that a certain structure is “indirectly” on other structures, that is, at least one structure is sandwiched between a certain structure and other structures.

The terms “about”, “equal to”, “equal” or “same”, “substantially” or “generally” are interpreted as within 20% of a given value or range, or interpreted as within 10%, 5%, 3%, 2%, 1%, or 0.5% of the given value or range. Furthermore, the terms “range from a first value to a second value”, “range between a first value to a second value” mean that the range includes the first value, the second value, and other values in between.

The terms such as “first”, “second”, etc. used in the description and the claims are used to modify elements, which do not imply and represent that the (or these) elements have any previous ordinal numbers, and also does not represent the order of a certain element and another element, or the order of the manufacturing method. The use of these ordinal numbers is to only clearly distinguish an element with a certain name from another element with the same name. The same terms may not be used in the claims and the description, and accordingly, the first component in the description may be the second component in the claims.

The electrical connection or coupling described in the disclosure may refer to direct connection or indirect connection. In the case of a direct connection, the end points of two elements on a circuit directly connect to each other, or connect to each other through a conductive wire. In the case of indirect connection, a switch, a diode, a capacitor, an inductor, a resistor, other suitable elements, or a combination thereof, but not limited therein, is between the end points of two elements on a circuit.

In the disclosure, the thickness, length, and width may be measured by adopting a measurement method such as an optical microscope (OM), and the thickness or width may be measured from a cross-sectional image in an electronic microscope, but not limited thereto. In addition, any two values or directions used for comparison may have certain errors. Additionally, references to the terms “equal to,” “equal,” “same,” “substantially,” or “generally” throughout this disclosure generally mean within 10% of a given value or range. Furthermore, the terms “a given range is from a first value to a second value”, “a given range is within a range from the first value to the second value”, or “a given range is between the first value to the second value” means that the given range includes the first value, the second value, and other values in between. If a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, an electronic device may include a display device, a backlight device, an antenna device, a packaging device, a sensing device or a splicing device, but is not limited thereto. The electronic device may be a bendable or flexible electronic device. The display device may be a non-self-luminous display device or a self-luminous display device. The display device may include, for example, liquid crystal, light emitting diode, fluorescence, phosphor, quantum dot (QD), other suitable display media, or a combination thereof. The antenna device may include, for example, a frequency selective surface (FSS), a radio frequency filter (RF-filter), a resonator, or an antenna, etc. The antenna may be a liquid crystal type antenna or a varactor diode antenna. The sensing device may be a sensing device for sensing capacitance, light, heat or ultrasonic waves, but not limited thereto. In the disclosure, an electronic device may include electronic elements, and the electronic elements may include passive elements and active elements, such as a capacitor, a resistor, an inductor, a diode, a transistor, and the like. Diodes may include light-emitting diodes, varactor diodes, or photodiodes. The light emitting diode may include, for example, an organic light emitting diode (OLED), a mini light emitting diode (mini LED), a micro light emitting diode (micro LED), or a quantum dot light emitting diode (quantum dot LED), but not limited thereto. The splicing device may be, for example, a display splicing device or an antenna splicing device, but not limited thereto. It should be noted that, the electronic device may be any arrangement and combination of the foregoing, but not limited thereto. The packaging device may be applicable to wafer-level package (WLP) technology or panel-level package (PLP) technology, such as the chip first or redistribution layer (RDL) first packaging process. In addition, the shape of the electronic device may be rectangular, circular, polygonal, a shape with curved edges, or other suitable shapes. The electronic device may have a peripheral system such as a driving system, a control system, a light source system, and the like to support a display device, an antenna device, a wearable device (e.g., including augmented reality or virtual reality), an in-vehicle device (e.g., including car windshields), or a splicing device.

It should be noted that, in the following embodiments, the features in several different embodiments may be replaced, reorganized, and mixed to complete other embodiments without departing from the spirit of the disclosure. As long as the features of the various embodiments do not violate the spirit of the disclosure or conflict with one another, they may be mixed and matched arbitrarily.

Figure 2:
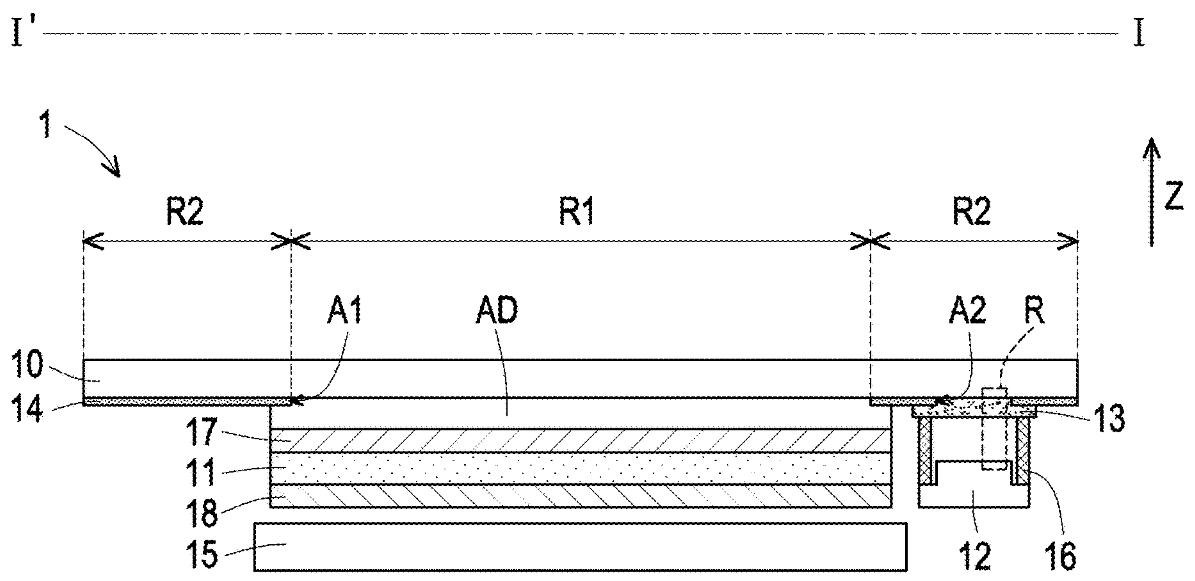
FIG. 2 is a cross-sectional schematic diagram along the section line I-I' of FIG. 1.
Figure 3:
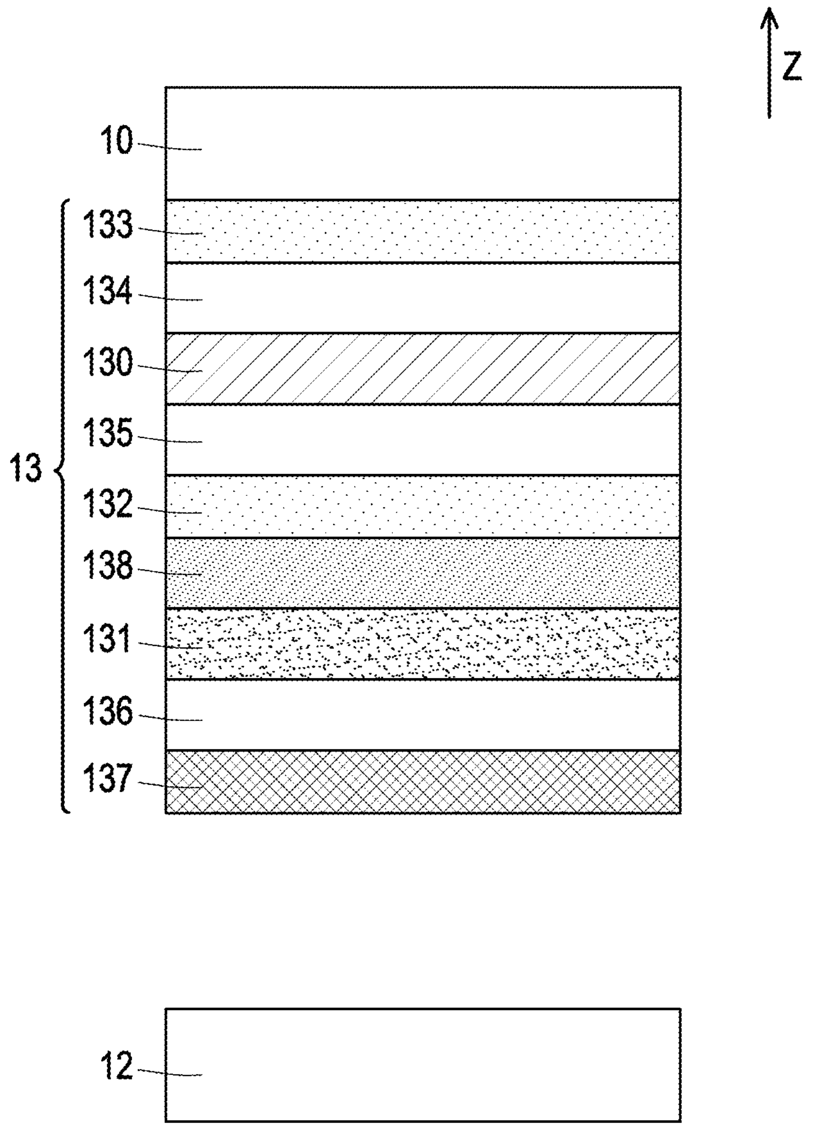
FIG. 3 is an enlarged schematic diagram of the region R in FIG. 2.
Figure 4:
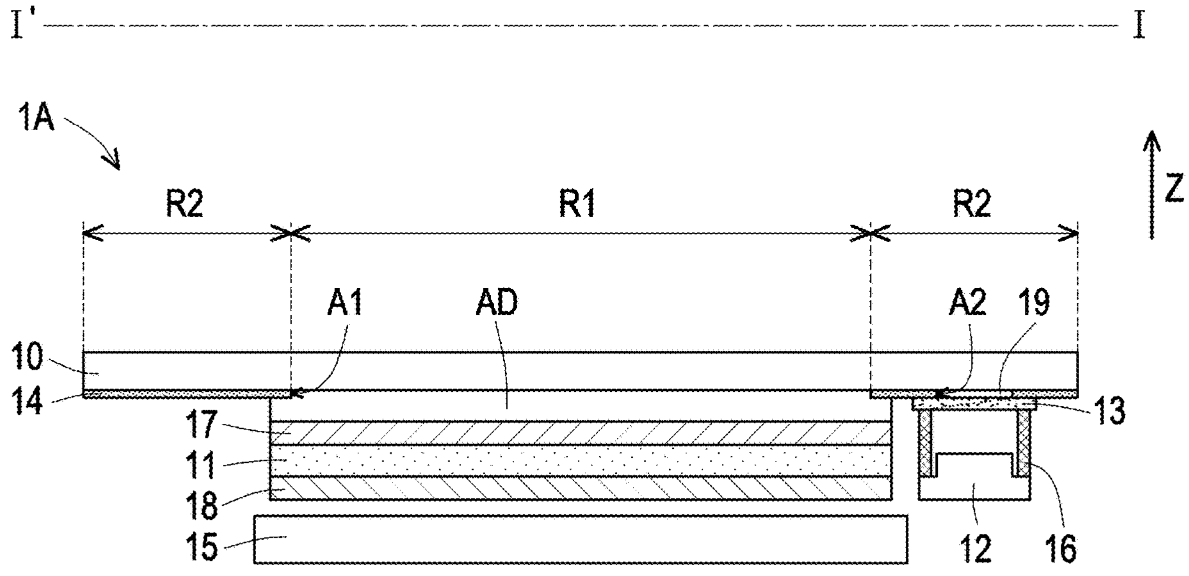
FIG. 4 and FIG. 5 are respectively other types of cross-sectional schematic diagrams along the section line I-I' of FIG. 1.
Figure 5:
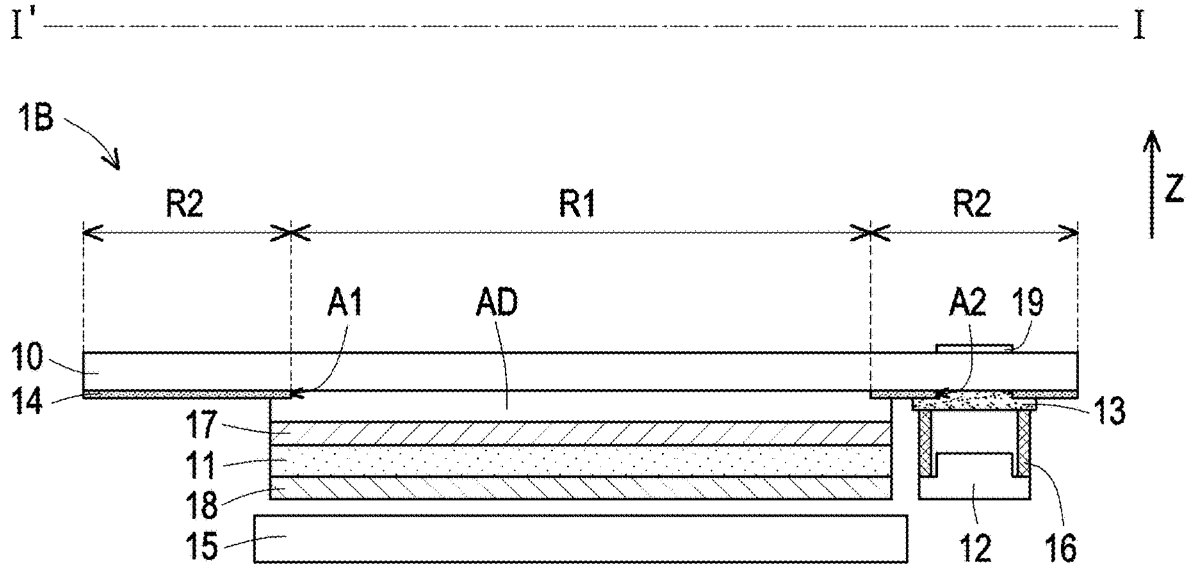
Figure 6:
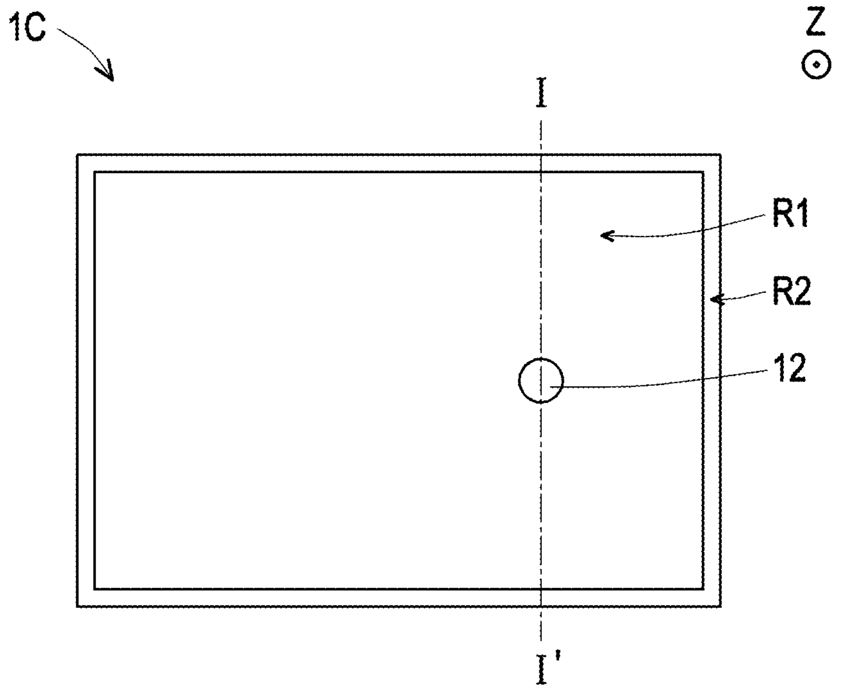
FIG. 6 is a top view schematic diagram of a display device according to another embodiment of the disclosure.

FIG. 1 is a top view schematic diagram of a display device according to an embodiment of the disclosure. FIG. 2 is a cross-sectional schematic diagram along the section line I-I' of FIG. 1. FIG. 3 is an enlarged schematic diagram of the region R in FIG. 2. FIG. 4 and FIG. 5 are respectively other types of cross-sectional schematic diagrams along the section line I-I' of FIG. 1. FIG. 6 is a top view schematic diagram of a display device according to another embodiment of the disclosure. FIG. 7 to FIG. 10 are respectively various cross-sectional schematic diagrams along the section line I-I' of FIG. 6. FIG. 11 is another cross-sectional schematic diagram along the section line I-I' of FIG. 1.

Referring to FIG. 1 to FIG. 3, a display device 1 includes a cover plate 10, a display panel 11, a sensor 12, and an optical structure 13. The display panel 11 is disposed under the cover plate 10. The sensor 12 is disposed under the cover plate 10. The optical structure 13 is disposed under the cover plate 10 and includes a polarizer 130 and a quarter-wave plate 131, in which the quarter-wave plate 131 is disposed between the polarizer 130 and the sensor 12.

For example, the display device 1 may be a vehicle display device, a medical display device, a public display device, a television, a tablet, or a mobile phone, etc., and not limited thereto. As shown in FIG. 1, the display device 1 may include a display region R1 and a peripheral region R2. The display region R1 may be configured to display image information, such as text or patterns. The peripheral region R2 is located on at least one side of the display region R1 and may be configured to provide peripheral circuits (not shown). In some embodiments, the peripheral region R2 may surround the display region R1, but not limited thereto. In some embodiments, the display device 1 may further include a decorative layer 14 to cover elements (e.g., peripheral circuits, etc.) of the display device 1 that are not intended to be seen by the user. The material of the decorative layer 14 includes, for example, opaque organic polymer materials, such as gray or black organic polymer materials (e.g., black matrix), but not limited thereto. The decorative layer 14 is disposed under the cover plate 10 and located in the peripheral region R2. The decorative layer 14 may have an opening A1 that exposes the display region R1 so that the user may see the image information displayed in the display region R1. In some embodiments, the sensor 12 may be disposed in the peripheral region R2. In these embodiments, the decorative layer 14 may also have an opening A2 that exposes the sensor 12 so that external light may be received by the sensor 12. In some embodiments, although not shown, the number of sensors 12 disposed in the peripheral region R2 may be multiple, and the decoration layer 14 may have multiple openings A2 respectively exposing the multiple sensors 12.

The cover plate 10 may be configured to protect the elements or film layers located thereunder. The cover plate 10 may be a rigid substrate or a flexible substrate. The material of the cover plate 10 includes, for example, glass, quartz, ceramics, sapphire, or plastic, etc., but not limited thereto. Plastics may include polycarbonate (PC), polyimide (PI), polypropylene (PP), polyethylene terephthalate (PET), and other suitable flexible materials or a combination of the aforementioned materials, but not limited thereto.

The display panel 11 may be configured to provide image information. The display panel 11 may be a non-self-luminous display panel or a self-luminous display panel. The non-self-luminous display panel may be, for example, a liquid crystal display panel, but is not limited thereto. The self-luminous display panel may be, for example, a light-emitting diode display panel, but not limited thereto. The light-emitting diode includes, for example, an organic light-emitting diode, a mini light-emitting diode, a micro light-emitting diode, or a quantum dot light-emitting diode, but not limited thereto.

Taking a liquid crystal display panel as an example, although not shown, the display panel 11 may include an active element array substrate, a color filter substrate, and a liquid crystal layer disposed between the active element array substrate and the color filter substrate, but not limited thereto. In the structure of a non-self-luminous display panel, the display device 1 may further include a backlight module 15 to provide illumination light. For example, the backlight module 15 may be a direct backlight module or an edge-lit backlight module, which is not limited thereto. The display panel 11 is disposed on the light exit side of the backlight module 15 (e.g., the upper side of the backlight module 15) to convert the illumination light into display light with image information (e.g., grayscale, color).

The sensor 12 may be configured to capture external images. In some embodiments, the sensor 12 may be configured to sense image information of at least one of infrared light and visible light, but not limited thereto. The sensor 12 includes, for example, a camera (e.g., an IR digital camera that may be configured to sense infrared light, an RGB digital camera that may be configured to sense visible light, or an RGBIR digital camera that may be configured to sense both visible light and infrared light), an infrared light sensor. (e.g., infrared light diodes), other suitable sensors, or a combination thereof. In some embodiments, the sensor 12 may be a portion of a driving monitoring system (DMS) or an occupant monitoring system (OMS), but not limited thereto. In some embodiments, the sensor 12 may be disposed on a pillar, trim panel, or other non-display device of the vehicle device.

The optical structure 13 is disposed corresponding to the sensor 12 to reduce the visibility of the sensor 12 (e.g., reducing the probability that the human eye detects the presence of the sensor 12). In this disclosure, the arrangement of one element corresponding to another element means that the element at least partially overlaps the other element in the thickness direction (e.g., direction Z) of the display device 1. In other words, the optical structure 13 at least partially overlaps the sensor 12 in the thickness direction (e.g., direction Z) of the display device 1. In some embodiments, as shown in FIG. 2, the orthographic projection of the sensor 12 on the cover plate 10 may completely fall within the orthographic projection of the optical structure 13 on the cover plate 10, but not limited thereto.

As shown in FIG. 3, the optical structure 13 may be disposed between the cover plate 10 and the sensor 12. In the optical structure 13, the polarizer 130 may be disposed between the quarter-wave plate 131 and the cover plate 10. That is, external light (including ambient light and reflected light) passes through the cover plate 10 and is sequentially transmitted to the polarizer 130 and the quarter-wave plate 131 before being transmitted toward the sensor 12. In this article, the polarizer 130 generally refers to a structure that may absorb light in a specific polarization direction, and the quarter-wave plate 131 generally refers to a structure that may generate a quarter phase difference after light passes through it. For example, each of the polarizer 130 and the quarter-wave plate 131 may include organic materials, inorganic materials, or combinations thereof. In some embodiments, the quarter-wave plate 131 may be formed of layers with different refractive indexes, but not limited thereto. In some embodiments, the included angle between the absorption axis (not shown) of the polarizer 130 and the optical axis (e.g., slow axis; not shown) of the quarter-wave plate 131 may range from 0 degrees to 90 degrees. That is, 0 degrees<included angle<90 degrees. In some embodiments, the included angle may be 45 degrees plus or minus 10 degrees, that is, 35 degrees<included angle<55 degrees.

Generally speaking, ambient light includes vertically polarized light and horizontally polarized light, while reflected light (e.g., light that is reflected by the object/person to be measured after ambient light strikes the object/person to be measured) is usually horizontally polarized light. The polarizer 130 may be designed to absorb vertically polarized light in the visible light band (e.g., 400 nm≤wavelength≤700 nm) and allow horizontally polarized light in the visible light band to pass through. In this way, most of the visible light in the reflected light (e.g., about 70% to 80% of the visible light) may penetrate the polarizer 130, while only about 40% to 50% of the visible light in the ambient light may penetrate the polarizer 130, thus achieving the effect of background removal (reducing the probability/light intensity of visible light in ambient light being received by the sensor 12). The horizontally polarized light (including ambient light and reflected light) is then converted into clockwise circularly polarized light by the quarter-wave plate 131. The clockwise circularly polarized light is reflected by the sensor 12 and then converted into counterclockwise circularly polarized light and transmitted toward the quarter-wave plate 131. The counterclockwise circularly polarized light is then converted into vertically polarized light by the quarter-wave plate 131. The vertically polarized light is absorbed by the polarizer 130 and cannot be emitted from the optical structure 13. By reducing the probability that visible light reflected by the sensor 12 is transmitted to the human eye, the visibility of the sensor 12 to the human eye may be reduced. In addition, the polarizer 130 may be designed to allow infrared light to pass through. For example, the transmittance of the polarizer 130 for infrared light may be more than 90% (e.g., about 95%), so that the IR digital camera system (if available) or RGBIR digital camera systems (if available) may maintain normal operation.

According to the above, the arrangement of the polarizer 130 and the quarter-wave plate 131 in the optical structure 13 facilitates the reduction of the visibility of the sensor 12 to the human eye, thereby improving the negative perception of surveillance among users. In addition, since the optical structure 13 allows visible light to pass through and may achieve the effect of background removal (removing visible light from ambient light), it facilitates the improvement of image quality.

According to different requirements, the optical structure 13 may also include one or more film layers or elements. In some embodiments, as shown in FIG. 3, the optical structure 13 may further include a first adhesive layer 132. The first adhesive layer 132 is disposed between the quarter-wave plate 131 and the polarizer 130 to adhere the quarter-wave plate 131 and the polarizer 130. The material of the first adhesive layer 132 includes, for example, optical clear adhesive (OCA) or optical clear resin (OCR), but not limited thereto.

In some embodiments, as shown in FIG. 3, the optical structure 13 may further include a second adhesive layer 133. The second adhesive layer 133 is disposed between the polarizer 130 and the cover plate 10 to adhere the polarizer 130 and the cover plate 10. For the material of the second adhesive layer 133, reference may be made to the material of the first adhesive layer 132, thus details are not repeated herein.

In some embodiments, as shown in FIG. 3, the optical structure 13 may further include a substrate 134, a substrate 135, and a substrate 136. The substrate 134 and the substrate 135 are respectively disposed on the opposite surfaces of the polarizer 130. The substrate 134 is disposed between the polarizer 130 and the cover plate 10, and the substrate 135 is disposed between the polarizer 130 and the first adhesive layer 132. The substrate 136 is disposed on a surface of the quarter-wave plate 131 away from the first adhesive layer 132. The materials of the substrate 134, the substrate 135, and the substrate 136 include, for example, polyethylene terephthalate (PET), polyethylene (PE), triacetate cellulose (TAC) or a combination thereof, but not limited thereto.

In some embodiments, as shown in FIG. 3, the optical structure 13 may further include a surface treatment layer 137. The surface treatment layer 137 is disposed on the surface of the quarter-wave plate 131 away from the cover plate 10. In the case where the substrate 136 is provided, the surface treatment layer 137 may be disposed on a surface of the substrate 136 away from the cover plate 10. The surface treatment layer 137 includes, for example, an antiglare layer, a low reflection layer, an antireflection layer, an antistatic layer, a protective layer, or a combination of at least two of the above, but not limited thereto.

In some embodiments, as shown in FIG. 3, the optical structure 13 may further include a phase difference plate 138. The phase difference plate 138 may be disposed between the polarizer 130 and the quarter-wave plate 131 or between the quarter-wave plate 131 and the sensor 12. For example, the phase difference plate 138 may be disposed on a surface of the quarter-wave plate 131 facing the cover plate 10 and between the quarter-wave plate 131 and the first adhesive layer 132. Alternatively, the phase difference plate 138 may be disposed on the surface of the quarter-wave plate 131 facing the sensor 12 and between the quarter-wave plate 131 and the substrate 136, but not limited thereto. The phase difference plate 138 may be any type of phase difference plate, as long as it may compensate for the phase delay under side view, so that the visibility of the sensor 12 to the human eye under side view may be reduced. For example, the phase difference plate 138 may include an A-plate, a C-plate, an O-plate, or a combination of at least two of the above, but not limited thereto.

Any film layer in the optical structure 13 may be transparent or doped with dye or colored particles (e.g., gray dye or gray particles) to reduce the color difference between the region where the opening A2 (referring to FIG. 2) is located and the decorative layer 14, further reducing the visibility of the sensor 12 to the human eye. For example, the material of the first adhesive layer 132 and/or the second adhesive layer 133 may further include colored particles or dye (e.g., gray particles or gray dye) to reduce the color difference between the region where the opening A2 is located and the decorative layer 14, further reducing the visibility of the sensor 12 to the human eye.

In other embodiments, although not shown, the optical structure 13 may add or subtract one or more film layers. For example, the optical structure 13 may omit the surface treatment layer 137, the phase difference plate 138, or a combination thereof, but not limited thereto. The optical structure 13 in any embodiment of the disclosure may adopt the structure shown in FIG. 3 or the alternative structure mentioned above, which are not repeated below.

Referring to FIG. 2 again, according to different requirements, the display device 1 may also include other elements or film layers. For example, the display device 1 may further include a sleeve 16 to fix the sensor 12. In some embodiments, the sleeve 16 may be fixed on the surface of the optical structure 13 away from the cover plate 10, but not limited thereto.

In some embodiments, as shown in FIG. 2, the display device 1 may further include a polarizer 17 and a polarizer 18. The polarizer 17 and the polarizer 18 are respectively disposed on opposite surfaces (e.g., upper and lower surfaces) of the display panel 11, in which the polarizer 17 and the polarizer 18 may have absorption axes that are perpendicular to each other or parallel to each other.

In some embodiments, as shown in FIG. 2, the display device 1 may further include an adhesive layer AD to adhere the polarizer 17 and the cover plate 10. For the material of the adhesive layer AD, reference may be made to the material of the first adhesive layer 132, thus details are not repeated herein.

Referring to FIG. 4, the main difference between the display device 1A and the display device 1 of FIG. 2 is that the display device 1A further includes an ink layer 19. The ink layer 19 overlaps the sensor 12, and the transmittance of the ink layer 19 for visible light is greater than 0% and less than 100%. For example, the transmittance of the ink layer 19 for visible light is greater than or equal to 30% and less than or equal to 95%, greater than or equal to 40% and less than or equal to 95%, greater than or equal to 50% and less than or equal to 95%, greater than or equal to 60% and less than or equal to 95%, greater than or equal to 70% and less than or equal to 95%, but not limited thereto. In some embodiments, the ink layer 19 may be formed by printing or coating. In some embodiments, the transmittance of the ink layer 19 may be controlled through pattern design, material composition, thickness, etc. In some embodiments, the ink layer 19 and the decorative layer 14 may have the same or different materials. When the ink layer 19 and the decorative layer 14 have the same material, the transmittance of the ink layer 19 may be improved by forming light-transmitting openings through pattern design or reducing the thickness of the ink layer 19. When the ink layer 19 and the decorative layer 14 have different materials, a suitable light-transmitting material may be selected to form the ink layer 19 to improve the transmittance of the ink layer 19.

The color difference between the region where the opening A2 is located and the decorative layer 14 may be reduced by forming the ink layer 19 that overlaps the sensor 12, further reducing the visibility of the sensor 12 to the human eye.

In FIG. 4, the ink layer 19 is disposed in the opening A2 and between the optical structure 13 and the cover plate 10, but the disclosure is not limited thereto. In other embodiments, as shown in the display device 1B of FIG. 5, the ink layer 19 may be disposed on the surface of the cover plate 10 away from the display panel 11.

In all of FIG. 2, FIG. 4, and FIG. 5, the optical structure 13 is disposed on the surface of the cover plate 10 facing the display panel 11, but the disclosure is not limited thereto. In other embodiments, although not shown, the optical structure 13 may be disposed on a surface of the cover plate 10 away from the display panel 11. Alternatively, the ink layer 19 and the optical structure 13 are both disposed on the surface of the cover plate 10 away from the display panel 11, and the optical structure 13 is located between the ink layer 19 and the sensor 12. In addition, in FIG. 2, FIG. 4, and FIG. 5, although the display panel 11 is exemplified as a non-self-luminous display panel, in other embodiments, although not shown, the display panel 11 may be replaced with a self-luminous display panel. In these embodiments, the display device may omit the backlight module 15.

Figure 7:
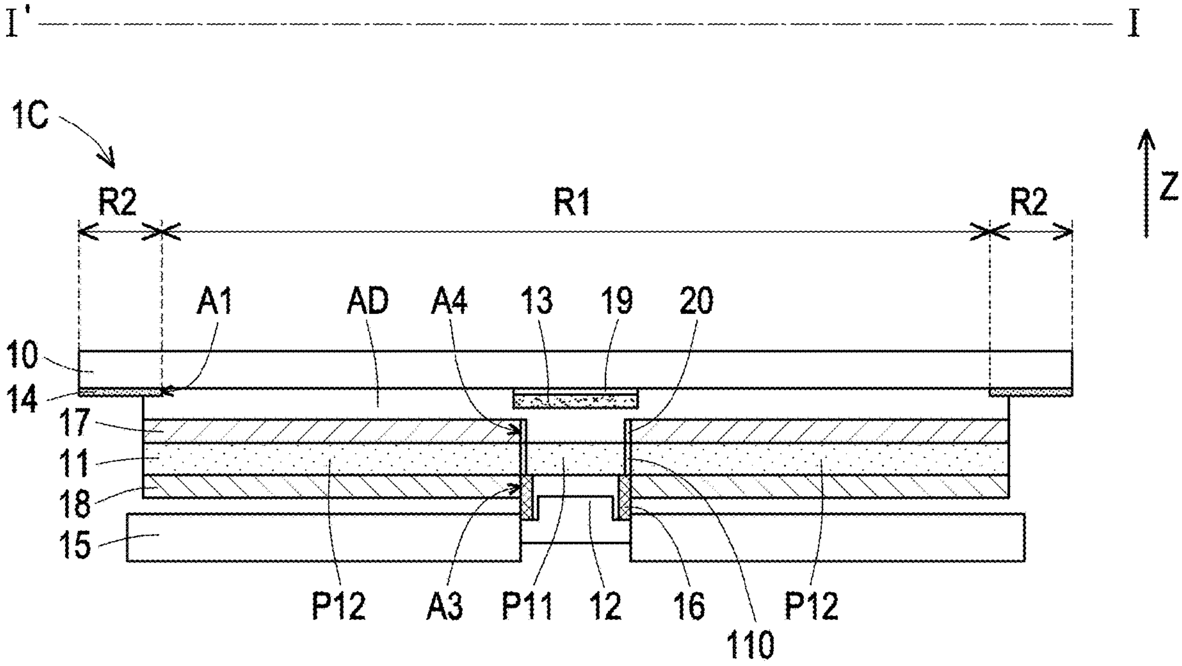
FIG. 7 to FIG. 10 are respectively various cross-sectional schematic diagrams along the section line I-I' of FIG. 6.

Referring to FIG. 6 and FIG. 7, the main differences between the display device 1C and the display device 1 of FIG. 1 and FIG. 2 are described below. In the display device 1C, the sensor 12 is disposed in the display region R1. In some embodiments, although not shown, the number of sensors 12 disposed in the display region R1 may be multiple. Taking a vehicle display device as an example, multiple sensors 12 may be disposed in a black region (a region not mainly used for display) of the dashboard. In some embodiments, as shown in FIG. 7, the sleeve 16 may be embedded in the opening A3 of the polarizer 18. In addition, the portion P11 of the display panel 11 that overlaps the sensor 12 and the portion P12 of the display panel 11 that does not overlap the sensor 12 may have different stacking structures. For example, the portion P11 may include a light-transmitting layer (e.g., substrate, dielectric layer, protective layer, etc.) and not include a non-light-transmitting layer or light-modulating layer (e.g., liquid crystal layer, metal layer, filter layer, etc.). In addition, the display panel 11 may include a blocking wall 110, in which the blocking wall 110 is disposed at the boundary of the portion 11 and the portion 12 to maintain the liquid crystal material in a region outside the sensor 12. In some embodiments, the blocking wall 110 may adopt a light-shielding material (e.g., a black matrix) to reduce light leakage, but not limited thereto. Furthermore, the display device 1C may also include a blocking wall 20, in which the blocking wall 20 is disposed on the side wall of the opening A4 of the polarizer 17, and the blocking wall 20 may adopt a light-shielding material (e.g., a black matrix) to reduce light leakage, but not limited thereto.

In FIG. 7, the display device 1C also includes an ink layer 19 overlapping the sensor 12, and the transmittance of the ink layer 19 for visible light is greater than 0% and less than 100%. For example, the transmittance of the ink layer 19 for visible light is greater than or equal to 30% and less than or equal to 95%, greater than or equal to 40% and less than or equal to 95%, greater than or equal to 50% and less than or equal to 95%, greater than or equal to 60% and less than or equal to 95%, greater than or equal to 70% and less than or equal to 95%, but not limited thereto. In addition, FIG. 7 schematically shows that the ink layer 19 is disposed between the cover plate 10 and the optical structure 13, but the disclosure is not limited thereto. In other embodiments, although not shown, the ink layer 19 may be disposed on a surface of the cover plate 10 away from the display panel 11. Alternatively, the ink layer 19 and the optical structure 13 are both disposed on the surface of the cover plate 10 away from the display panel 11, and the optical structure 13 is disposed between the ink layer 19 and the cover plate 10. Alternatively, the display device 1C may omit the ink layer 19.

Figure 8:
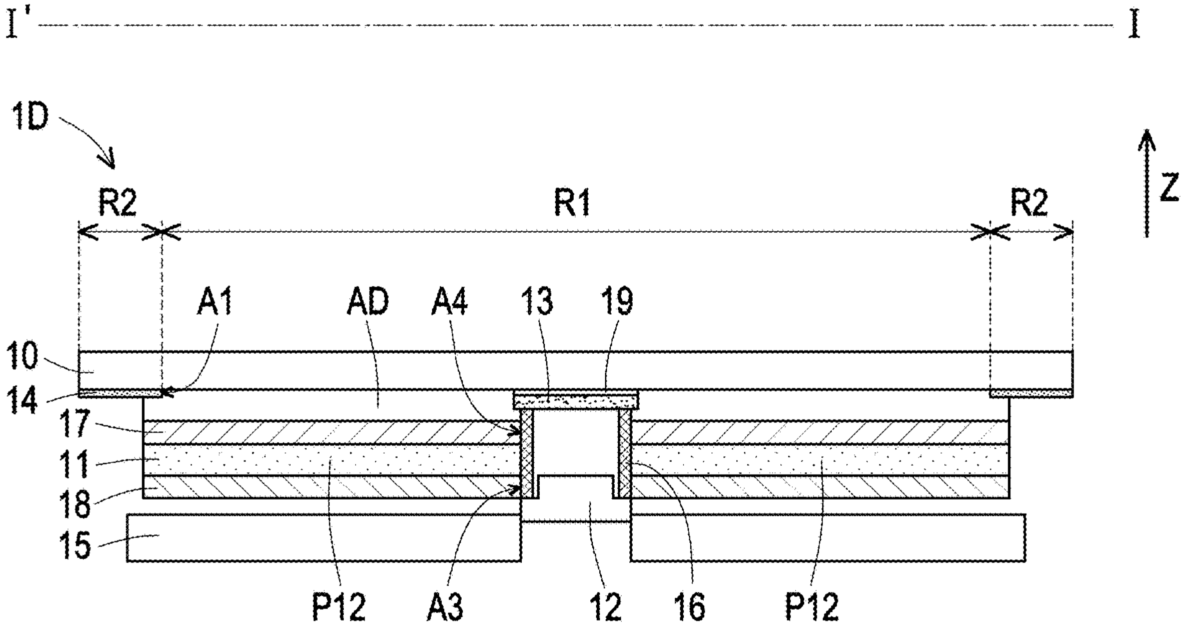

Referring to FIG. 8, the main differences between the display device 1D and the display device 1C of FIG. 7 are described as follows. In the display device 1D, the portion P11 of the display panel 11 that overlaps the sensor 12 is removed (referring to FIG. 7), and the sleeve 16 is embedded in the opening A3 of the polarizer 18, the hollow region of the display panel 11, and the opening A4 of the polarizer 17.

FIG. 8 schematically shows that the ink layer 19 is disposed between the cover plate 10 and the optical structure 13, but the disclosure is not limited thereto. In other embodiments, although not shown, the ink layer 19 may be disposed on a surface of the cover plate 10 away from the display panel 11. Alternatively, the ink layer 19 and the optical structure 13 are both disposed on the surface of the cover plate 10 away from the display panel 11, and the optical structure 13 is disposed between the ink layer 19 and the cover plate 10. Alternatively, the display device 1C may omit the ink layer 19.

Figure 9:
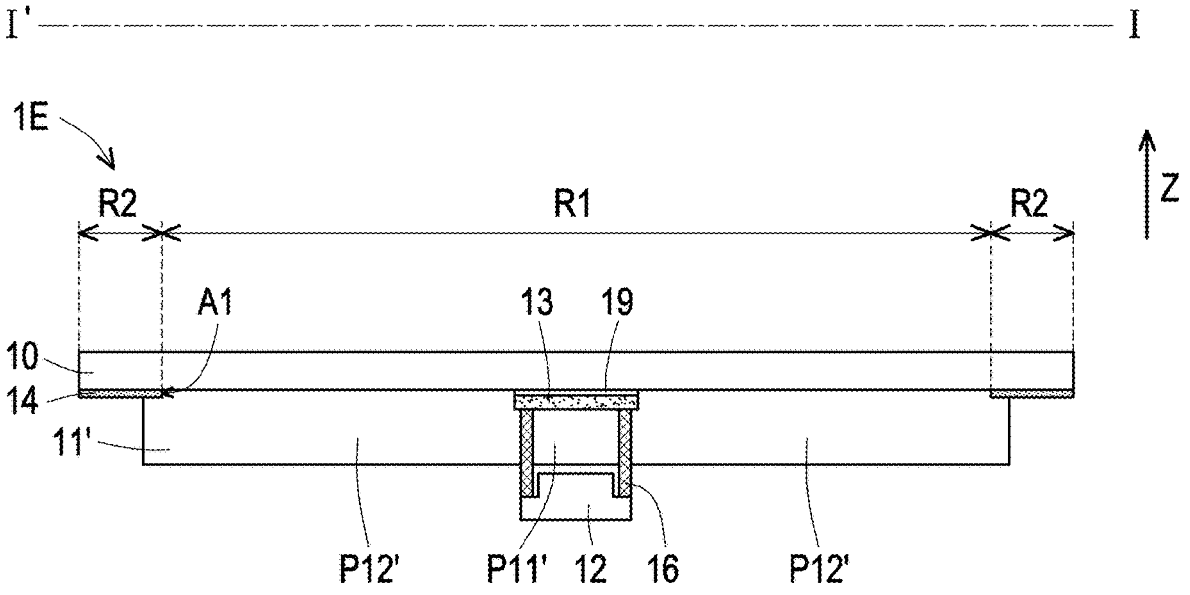

Referring to FIG. 9, the main differences between the display device 1E and the display device 1C of FIG. 7 are described as follows. In the display device 1E, the display panel 11' is a self-luminous display panel, such as a light-emitting diode display panel, but not limited thereto. The sleeve 16 is embedded in the display panel 11', in which the portion P11' of the display panel 11' that overlaps the sensor 12 and the portion P12' of the display panel 11' that does not overlap the sensor 12 may have different stacking structures. For example, the portion P11' may include a light-transmitting layer (e.g., substrate, dielectric layer, protective layer, etc.) and not include a non-light-transmitting layer or light-modulating layer (e.g., light-emitting layer, metal layer, filter layer, etc.).

In some embodiments, although not shown, the display device 1E may also include a polarizer disposed between the display panel 11' and the cover plate 10. The polarizer may have an opening disposed corresponding to the sensor 12 (e.g., referring to the design of polarizer 17 in FIG. 7), and the display device 1E may also include a blocking wall disposed on the side wall of the opening of the polarizer, but not limited thereto.

FIG. 9 schematically shows that the ink layer 19 is disposed between the cover plate 10 and the optical structure 13, but the disclosure is not limited thereto. In other embodiments, although not shown, the ink layer 19 may be disposed on a surface of the cover plate 10 away from the display panel 11'. Alternatively, the ink layer 19 and the optical structure 13 are both disposed on the surface of the cover plate 10 away from the display panel 11', and the optical structure 13 is disposed between the ink layer 19 and the cover plate 10. Alternatively, the display device 1C may omit the ink layer 19.

In some embodiments, although not shown, the optical structure 13 of the display device 1E may not only be disposed corresponding to the sensor 12 (i.e., disposed corresponding to the portion P11' where the display panel 11' overlaps the sensor 12), but may also be disposed corresponding to the portion P12' of the display panel 11' that does not overlap the sensor 12. The optical structure 13 may, for example, be a continuous structure extending from the corresponding portion P11' to the corresponding portion P12'. The optical structure 13 overlaps the display panel 11 and the sensor 12.

Figure 10:
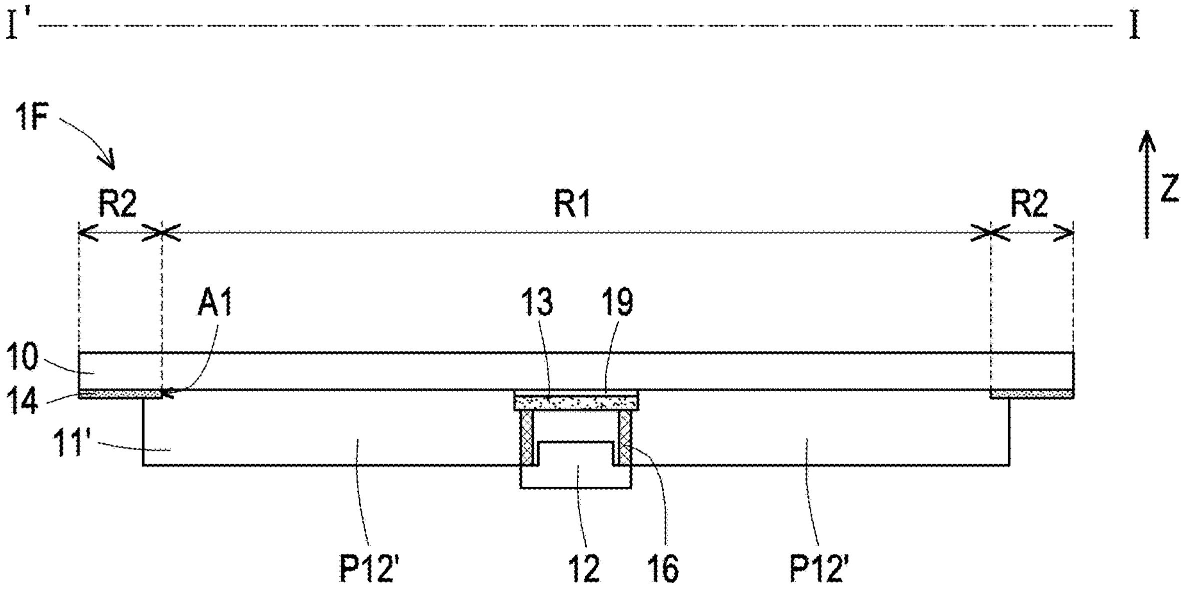
Figure 11:
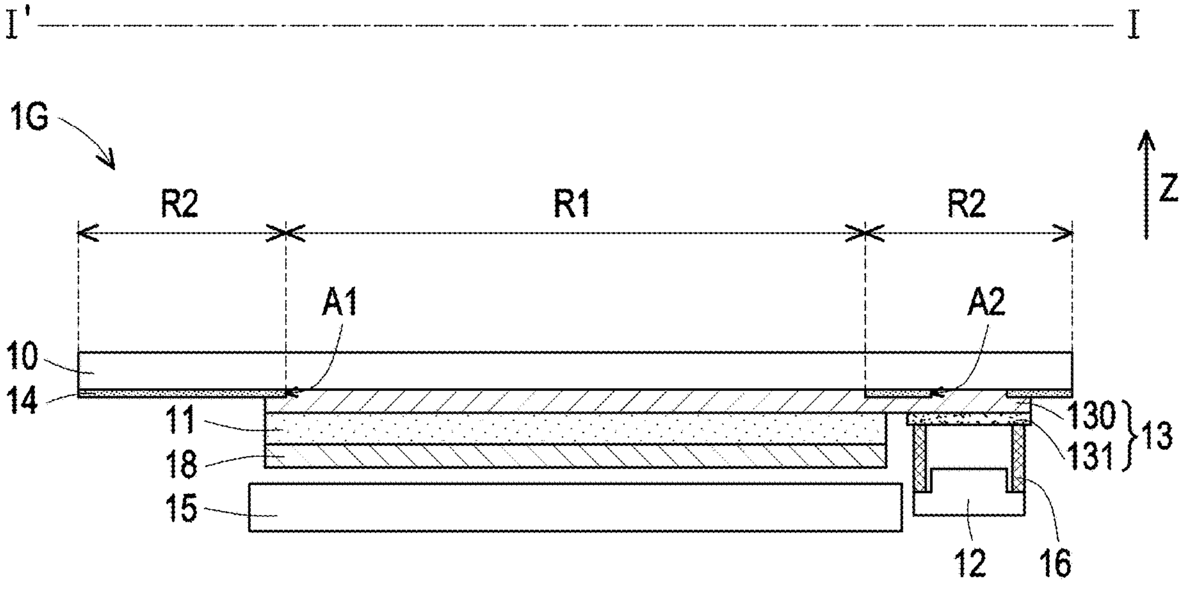
FIG. 11 is another cross-sectional schematic diagram along the section line I-I' of FIG. 1.

Referring to FIG. 10, the main differences between the display device 1F and the display device 1E of FIG. 9 are described as follows. In the display device 1F, the portion P11' of the display panel 11' that overlaps the sensor 12 is removed (referring to FIG. 9), and the sleeve 16 is embedded in the hollow region of the display panel 11' and the opening of the polarizer (if available) disposed between the display panel 11' and the cover plate 10.

FIG. 10 schematically shows that the ink layer 19 is disposed between the cover plate 10 and the optical structure 13, but the disclosure is not limited thereto. In other embodiments, although not shown, the ink layer 19 may be disposed on a surface of the cover plate 10 away from the display panel 11'. Alternatively, the ink layer 19 and the optical structure 13 are both disposed on the surface of the cover plate 10 away from the display panel 11', and the optical structure 13 is disposed between the ink layer 19 and the cover plate 10. Alternatively, the display device 1C may omit the ink layer 19.

In some embodiments, although not shown, the optical structure 13 of the display device 1F may not only be disposed corresponding to the sensor 12, but may also be disposed corresponding to the portion P12' of the display panel 11' that does not overlap the sensor 12. The optical structure 13 may, for example, be a continuous structure extending from the corresponding sensor 12 to the corresponding portion P12'. The optical structure 13 overlaps the display panel 11 and the sensor 12. Referring to FIG. 11, the main differences between the display device 1G and the display device 1 of FIG. 2 are described as follows. In the display device 1G, the polarizer 130 overlaps the display panel 11 and the sensor 12, that is, the display panel 11 and the optical structure 13 share the polarizer 130. Therefore, the display device 1G may omit the polarizer 17 in FIG. 2. For the sake of simplicity, FIG. 11 does not show the adhesive layer AD shown in FIG. 2, nor does it show other film layers in the optical structure 13 besides the polarizer 130 and the quarter-wave plate 131 (referring to FIG. 3). However, it should be understood that the display device 1G and the optical structure 13 within the display device 1G may increase or decrease one or more elements or film layers according to the requirements. Furthermore, any embodiment of the disclosure (including those shown in the drawings and those described in the text) may adopt the design of the shared polarizer 130, and details are not repeated herein.

To sum up, in the embodiments of the disclosure, the arrangement of the optical structure facilitates the reduction of the visibility of the sensor, thereby improving the negative perception of surveillance among users.

The foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

Although the embodiments of the disclosure and the advantages thereof have been disclosed above, it should be understood that any person with ordinary skill in the art may make changes, substitutions, and modifications without departing from the spirit and scope of the disclosure, and the features of the various embodiments may be arbitrarily mixed and replaced with one another to form other new embodiments. In addition, the protection scope of the disclosure is not limited to the processes, machines, manufactures, compositions of the matter, devices, methods, and steps in the specific embodiments described in the specification. It is understood that crafts, machines, manufactures, compositions of matter, devices, methods, and steps developed in the present or in the future may be used in accordance with the disclosure as long as they may implement substantially the same functions or achieve substantially the same results in the embodiments described herein. Therefore, the protection scope of the disclosure includes the above-mentioned crafts, machines, manufactures, compositions of matter, devices, methods, and steps. In addition, each of the claims constitutes a separate embodiment, and the protection scope of the disclosure also includes each of the combinations of the claims and the embodiments. The protection scope of the disclosure shall be determined by the appended claims.

What is claimed is:

1. A display device, comprising:
- a cover plate;
- a display panel, disposed under the cover plate;
- a sensor, disposed under the cover plate, wherein the display panel having a first portion overlaps the sensor and a second portion dose not overlap the sensor; and
- an optical structure, disposed under the cover plate and comprising a polarizer and a quarter-wave plate, wherein the quarter-wave plate is disposed between the polarizer and the sensor, and
- a blocking wall is disposed at a boundary of the first portion and the second portion, wherein the blocking wall including a light-shielding material.

2. The display device according to claim 1, wherein the sensor is configured to sense image information of at least one of infrared light and visible light.

3. The display device according to claim 1, wherein the optical structure further comprises:
- a first adhesive layer, disposed between the quarter-wave plate and the polarizer.

4. The display device according to claim 3, wherein the first adhesive layer is doped with dye or colored particles.

5. The display device according to claim 1, wherein the optical structure further comprises:
- a second adhesive layer, disposed between the polarizer and the cover plate.

6. The display device according to claim 5, wherein the second adhesive layer is doped with dye or colored particles.

7. The display device according to claim 1, wherein the optical structure further comprises:
- a surface treatment layer, disposed on a surface of the quarter-wave plate away from the cover plate.

8. The display device according to claim 1, wherein, the polarizer overlaps the display panel and the sensor.

9. The display device according to claim 1, wherein the display device comprises a display region and a peripheral region, and the sensor is disposed in the peripheral region.

10. The display device according to claim 1, wherein the display device comprises a display region and a peripheral region, and the sensor is disposed in the display region.

11. The display device according to claim 10, wherein the display panel has a hollow region in the display region, and the sensor is disposed in the hollow region.

12. The display device according to claim 10, wherein the display panel is disposed between the sensor and the cover plate, and the first portion and the second portion have different stacking structures.

13. The display device according to claim 12, wherein the first portion comprises a light-transmitting layer, and the second portion comprises at least two of a light-transmitting layer, a non-light-transmitting layer, and a light-modulating layer.

14. The display device according to claim 12, wherein the display panel is a liquid crystal display panel.

15. The display device according to claim 1, further comprising:

an ink layer, disposed between the display panel and the cover plate or on a surface of the cover plate away from the display panel, and overlapping the sensor.

16. The display device according to claim 15, wherein a transmittance of the ink layer for visible light is greater than or equal to 30% and less than or equal to 95%, greater than or equal to 40% and less than or equal to 95%, greater than or equal to 50% and less than or equal to 95%, greater than or equal to 60% and less than or equal to 95%, or greater than or equal to 70% and less than or equal to 95%.

17. The display device according to claim 15, further comprising:

a decorative layer, disposed under the cover plate and having a first opening exposing the display panel and a second opening exposing the sensor, wherein the ink layer is disposed in the second opening and located between the optical structure and the cover plate.

18. The display device according to claim 15, further comprising:

a decorative layer, disposed under the cover plate and having a first opening exposing the display panel and a second opening exposing the sensor, wherein the ink layer is disposed corresponding to the second opening, and the cover plate is located between the optical structure and the ink layer.

19. The display device according to claim 15, further comprising:

a decorative layer, disposed under the cover plate and having an opening exposing the display panel, wherein the ink layer is disposed in the opening and is located between the optical structure and the cover plate.

20. The display device according to claim 1, further comprising:

a sleeve, configured to fix the sensor, wherein the sleeve is fixed under the optical structure away from the cover plate.

* * * * *